(No Model.)
R. & S. T. BRUCE.
CORN PLANTER.
No. 249,295. Patented Nov. 8, 1881.
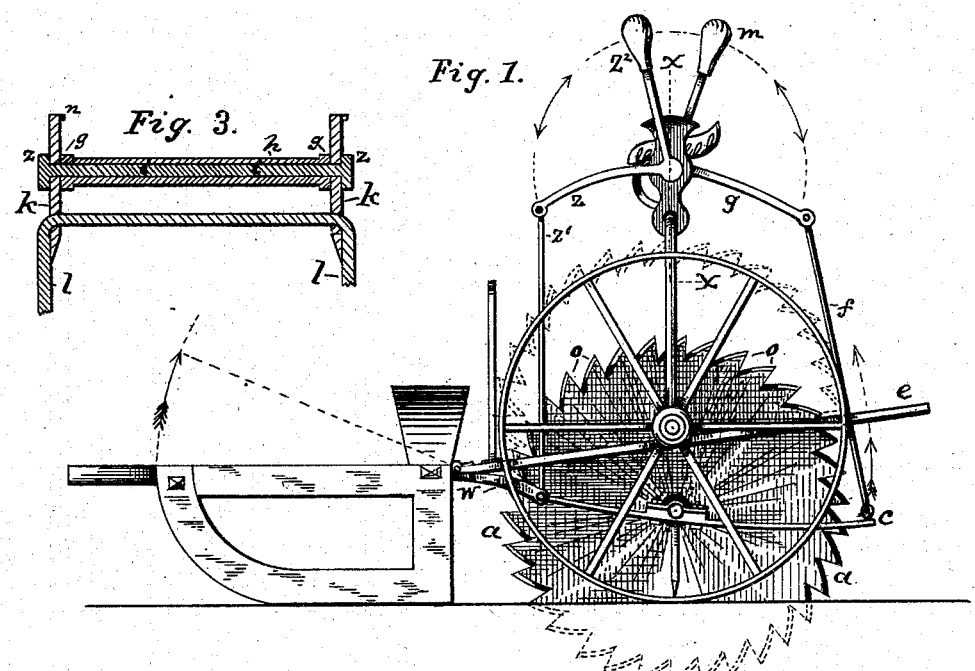
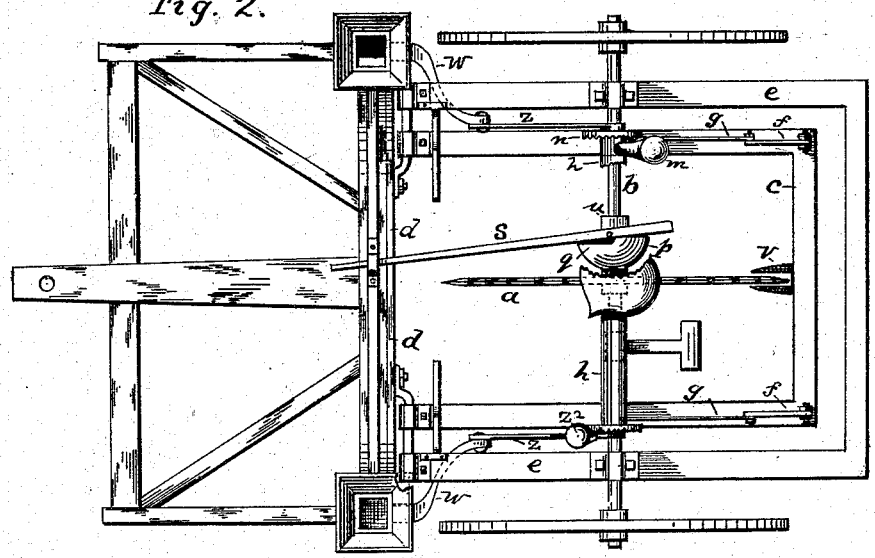
WITNESSES:
Thos. Houghton.
A. G. Lyne.
INVENTOR:
R. Bruce
S. T. Bruce
BY
ATTORNEYS.

UNITED STATES PATENT OFFICE.

ROBERT BRUCE AND SIDNEY T. BRUCE, OF MARSHALL, MISSOURI; SAID SIDNEY T. BRUCE ASSIGNOR TO SAID ROBERT BRUCE.

CORN-PLANTER.

SPECIFICATION forming part of Letters Patent No. 249,295, dated November 8, 1881.

Application filed June 13, 1881. (No model.)

*To all whom it may concern:*

Be it known that we, ROBERT BRUCE and SIDNEY THOMAS BRUCE, of Marshall, in the county of Saline and State of Missouri, have invented a new and useful Improvement in Corn-Planters, of which the following is a full, clear, and exact description, reference being had to the annexed drawings, forming part of this specification.

Our invention relates to check-row planters; and it has for its object to provide a check-row dropping device which shall be perfectly accurate in its operation.

The invention consists in a toothed circular disk adapted to cut through the loose soil to the solid ground beneath, whereby its revolutions shall be rendered more uniform, in combination with certain other parts, as hereinafter more particularly described.

In the accompanying drawings, Figure 1 is a side elevation; Fig. 2, a plan view; Fig. 3, a vertical section through line $xx$ of Fig. 1, and Fig. 4 a detail.

Heretofore in automatic check-row planters the dropping-slide has generally been operated by means of a driving-wheel, which is made to rotate in or upon the surface of the ground by the forward movement of the planter; but owing to the greater or less degree of irregularity in the plowed lands and the unsteady support furnished to the driving-wheel by the broken soil, the revolutions of the said wheel are not always governed by the actual extent of space passed over by the planter, and consequently the hills of corn are not planted in perfect check-row. To overcome this objection we provide a thin circular metallic disk, $a$, which is rigidly secured upon a shaft, $b$, and supported in an oscillating frame, $c$, whose forward end is hinged to the cross-bar $d$ of the forward part of the planter.

To the rear end of frame $c$, which is arranged within the main frame $e$, are pivoted two levers, $ff$, which are also pivoted at their upper ends, respectively, to the arms $g\ g$. These arms are rigidly secured to the opposite ends of a sleeve, $h$, which is loosely mounted upon a shaft, $i$, which is journaled in brackets $k\ k$, secured to the upper corners of the rectangular axle $l$. By means of a lever, $m$, and a rack, $n$, at the upper end of one of the brackets, the sleeve $h$ and arms $g\ g$ are oscillated to raise or lower the disk $a$. The said disk is provided with rearwardly-inclined teeth $o$, whose forward edge is made sharp, in order that the disk shall readily cut through stalks and other obstructions, while the rear edge of the teeth is made square to prevent the same from sliding forward or otherwise, the teeth entering into the hard ground beneath the broken soil, and thus holding firmly.

A bell-shaped cam, $p$, having a semicircular recess, $q$, cut in its rim, is rigidly secured upon the shaft $b$, and in its concavity the hub $r$ of the lever $s$ is keyed upon a sleeve, $t$, which is held in position by the collar $u$ upon the said shaft. As the cam rotates with the disk the lever $s$ is made to oscillate twice at each revolution of the former to operate the dropping-slide.

At the rear end of frame $c$ is a scraper, $v$, for removing any particles of earth that may adhere to the disk.

The main frame $e$ at its forward end is hinged to the cross-bar $d$, so that the runners may be lifted out of the ground by means of the arms $w$ at the rear portion thereof by depressing the same by means of the oscillating arms $z$, which are connected therewith by the pivoted upright levers $z'$. The arms $z$ are rigidly secured to the outer ends of shaft $i$ and oscillated by a lever, $z^2$, and a rack similar to the one above described.

We are aware that a driving-wheel to a corn-planter having spikes arranged on its periphery, which are adapted to penetrate the soil to insure the rotation of said wheel, has before been used, as well as a spoked wheel having a sharp scalloped rim; but we are not aware that a thin solid metallic disk having teeth with rearwardly-inclined cutting-edges has before been adapted to rotate in contact with the hard ground under the loose soil for the purpose of driving a seed-dropping mechanism.

Having thus described our invention, what we claim as new, and desire to secure by Letters Patent, is—

1. In a check-row corn-planter, the thin metallic disk having teeth with rearwardly-inclined cutting-edges and square rear edges, in combination with a vertically-adjustable frame and a seed-dropping mechanism, whereby the disk is adapted to penetrate deeply into the soil and rotate in contact with the hard ground underneath, substantially as shown and described, and for the purpose set forth.

2. In a check-row corn-planter, the combination of disk $a$, having rearwardly-inclined teeth, constructed as described, oscillating frame $c$, shaft $b$, scraper $v$, levers $ff$, arms $gg$, sleeve $h$, shaft $i$, brackets $kk$, lever $m$, rack $n$, and rectangular axle $l$, substantially as shown and described.

3. In a check-row corn-planter, the combination of the shaft $i$, having arms $z$ and lever $z^2$, journaled in brackets $k$, which are supported upon the rectangular axle $l$, and the sleeve $h$, loosely mounted upon said shaft, and having arms $g$ and lever $m$, substantially as shown and described, said parts being connected with the runners and driving-wheel, respectively, as set forth.

ROBERT BRUCE.
SIDNEY THOMAS BRUCE.

Witnesses:
JAMES WINGFIELD,
HENRY STROTHER.